(12) United States Patent
Shain et al.

(10) Patent No.: US 9,811,286 B1
(45) Date of Patent: Nov. 7, 2017

(54) SYSTEM AND METHOD FOR STORAGE MANAGEMENT

(71) Applicant: EMC Corporation, Hopkinton, MA (US)

(72) Inventors: Randall H. Shain, Wrentham, MA (US); Arieh Don, Newton, MA (US); Roy E. Clark, Hopkinton, MA (US); Philip Derbeko, Modiin, IL (US); Yaron Dar, Sudbury, MA (US); Alex Veprinsky, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 153 days.

(21) Appl. No.: 13/729,780

(22) Filed: Dec. 28, 2012

(51) Int. Cl.
*G06F 12/00* (2006.01)
*G06F 3/06* (2006.01)

(52) U.S. Cl.
CPC .................................. *G06F 3/0647* (2013.01)

(58) Field of Classification Search
CPC ...................................................... G06F 3/0647
USPC ......................................... 711/114, 117, 170
See application file for complete search history.

(56) References Cited

U.S. PATENT DOCUMENTS

| | | | |
|---|---|---|---|
| 2003/0115439 A1* | 6/2003 | Mahalingam et al. | 712/1 |
| 2005/0268062 A1* | 12/2005 | Nagase et al. | 711/167 |
| 2006/0107018 A1* | 5/2006 | Lyle | G06F 3/0605 |
| | | | 711/172 |
| 2009/0198748 A1* | 8/2009 | Ash et al. | 707/204 |
| 2010/0250896 A1* | 9/2010 | Matze | 711/216 |
| 2010/0274982 A1* | 10/2010 | Mehr | G06F 11/1458 |
| | | | 711/162 |
| 2011/0106862 A1* | 5/2011 | Mamidi et al. | 707/823 |

* cited by examiner

*Primary Examiner* — Gurtej Bansal
(74) *Attorney, Agent, or Firm* — Brian J. Colandreo; Mark H. Whittenberger; Holland & Knight LLP

(57) ABSTRACT

A method, computer program product, and computing system for defining a storage space having a defined capacity within a storage system. The storage system includes a frontend system and a backend system. A first portion of the storage space is located within the frontend system. A second portion of the storage space is located within the backend system. Usage of a data item stored within the storage space is monitored to identify a usage pattern. The data item is migrated to either the first portion of the storage space or the second portion of the storage space based, at least in part, upon the usage pattern.

22 Claims, 3 Drawing Sheets

SYSTEM AND METHOD FOR STORAGE MANAGEMENT

TECHNICAL FIELD

This disclosure relates to storage systems and, more particularly, to distributed storage systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In one implementation, a computer-implemented method includes defining a storage space having a defined capacity within a storage system. The storage system includes a frontend system and a backend system. A first portion of the storage space is located within the frontend system. A second portion of the storage space is located within the backend system. Usage of a data item stored within the storage space is monitored to identify a usage pattern. The data item is migrated to either the first portion of the storage space or the second portion of the storage space based, at least in part, upon the usage pattern.

One or more of the following features may be included. Migrating the data item may include relocating the data item from the first portion of the storage space to the second portion of the storage space based, at least in part, upon the usage pattern. Migrating the data item may include relocating the data item from the second portion of the storage space to the first portion of the storage space based, at least in part, upon the usage pattern. The first portion of the storage space may be a thinly provisioned first portion of the storage space. The second portion of the storage space may be a thinly provisioned second portion of the storage space. The first portion of the storage space may be within 100% and 0% of the defined capacity; and the second portion of the storage space may be within 0% and 100% of the defined capacity. The storage space may include a direct attached storage device.

In another implementation, a computer program product resides on a computer readable medium that has a plurality of instructions stored on it. When executed by a processor, the instructions cause the processor to perform operations including defining a storage space having a defined capacity within a storage system. The storage system includes a frontend system and a backend system. A first portion of the storage space is located within the frontend system. A second portion of the storage space is located within the backend system. Usage of a data item stored within the storage space is monitored to identify a usage pattern. The data item is migrated to either the first portion of the storage space or the second portion of the storage space based, at least in part, upon the usage pattern.

One or more of the following features may be included. Migrating the data item may include relocating the data item from the first portion of the storage space to the second portion of the storage space based, at least in part, upon the usage pattern. Migrating the data item may include relocating the data item from the second portion of the storage space to the first portion of the storage space based, at least in part, upon the usage pattern. The first portion of the storage space may be a thinly provisioned first portion of the storage space. The second portion of the storage space may be a thinly provisioned second portion of the storage space. The first portion of the storage space may be within 100% and 0% of the defined capacity; and the second portion of the storage space may be within 0% and 100% of the defined capacity. The storage space may include a direct attached storage device.

In another implementation, a computing system includes at least one processor and at least one memory architecture coupled with the at least one processor, wherein the computing system is configured to perform operations including defining a storage space having a defined capacity within a storage system. The storage system includes a frontend system and a backend system. A first portion of the storage space is located within the frontend system. A second portion of the storage space is located within the backend system. Usage of a data item stored within the storage space is monitored to identify a usage pattern. The data item is migrated to either the first portion of the storage space or the second portion of the storage space based, at least in part, upon the usage pattern.

One or more of the following features may be included. Migrating the data item may include relocating the data item from the first portion of the storage space to the second portion of the storage space based, at least in part, upon the usage pattern. Migrating the data item may include relocating the data item from the second portion of the storage space to the first portion of the storage space based, at least in part, upon the usage pattern. The first portion of the storage space may be a thinly provisioned first portion of the storage space. The second portion of the storage space may be a thinly provisioned second portion of the storage space. The first portion of the storage space may be within 100% and 0% of the defined capacity; and the second portion of the storage space may be within 0% and 100% of the defined capacity. The storage space may include a direct attached storage device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
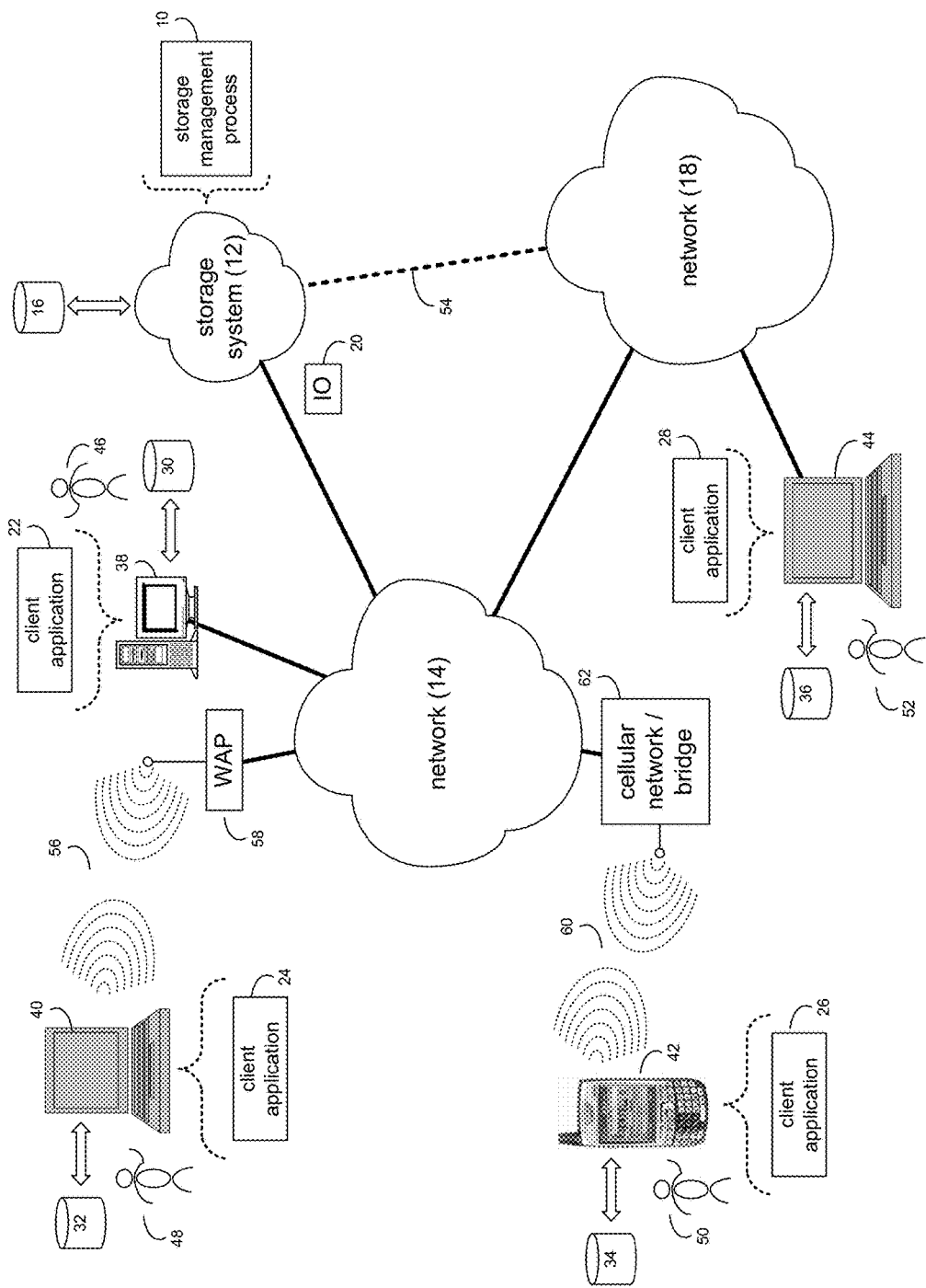
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
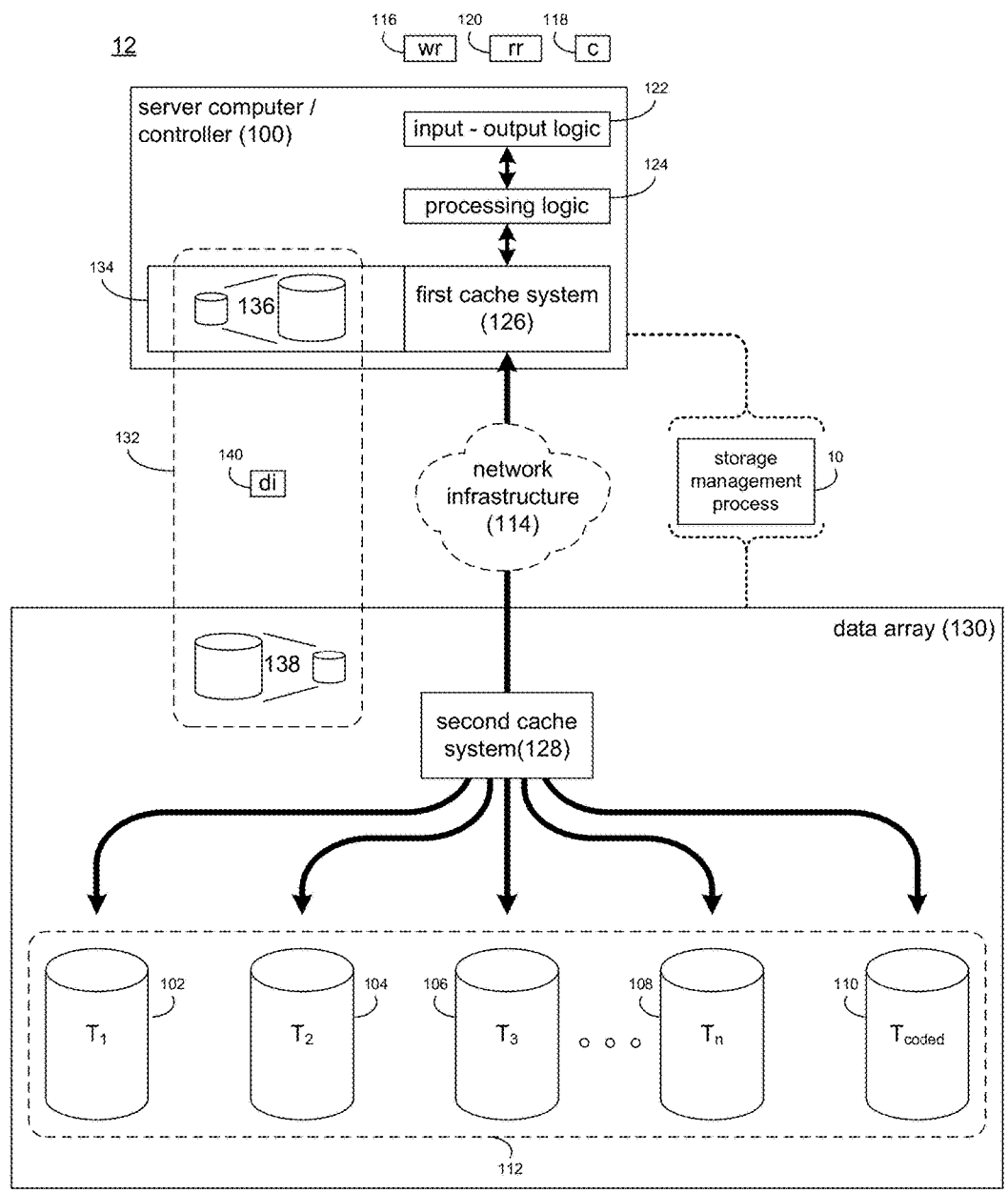
FIG. 2 is a diagrammatic view of the storage system of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of storage management process 10 may be executed by one or more processors (not shown) and one or more memory architectures (not shown) included within data array 130.

Figure 3:
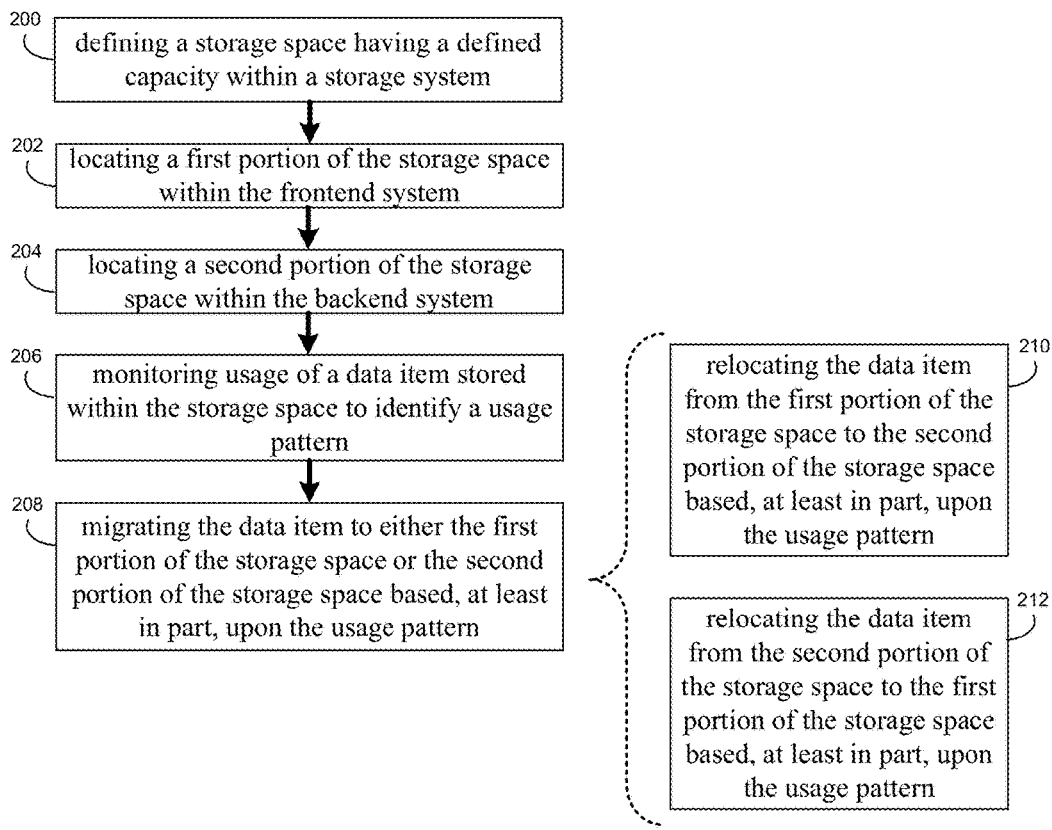
FIG. 3 is a flow chart of one implementation of the storage management process of FIG. 1.

The Storage Management Process:

Referring also to FIG. 3, storage management process 10 may define 200 a storage space (e.g., storage space 132) having a defined capacity within a storage system (e.g., storage system 12). Storage system 12 may include a frontend system (e.g., server computer/controller 100) and a backend system (e.g., data array 130).

As discussed above, server computer/controller 100 may include first cache system 128, wherein first cache system 128 may be a portion of storage device 134. Examples of storage device 134 may include but are not limited to volatile storage devices (e.g. DRAM-based storage devices) and non-volatile storage devices (e.g. flash-based storage devices). Accordingly and as shown in FIG. 3, storage space 132 may include a portion of storage device 134.

Storage space 132 may include a direct attached storage device (e.g., formed from a portion of storage device 134). As is known, direct attached storage devices may include digital storage systems that are directly attached to e.g. a server computer or workstation. For example, a flash-based storage device (e.g. an SSD) may be directly coupled to a hard drive controller (not shown) included within server computer/controller 100 and may function as a direct attached storage device for server computer/controller 100. Accordingly, this direct attached storage device may be a portion of storage space 132 and may allow for e.g. the storage of data/applications within server computer/controller 100.

Storage management process 10 may be configured to allow a user (e.g. user 46) to define 200 storage space 132. For example and through storage management process 10, user 46 may define 200 the capacity of storage space 132. As discussed above, client electronic device 38 and/or storage system 12 (when configured as an application server) may execute one or more applications that may require storage for storing data associated with these applications. Accordingly, data generated and/or utilized by such applications may be stored on storage space 132.

Storage management process 10 may locate 202 a first portion (e.g., portion 136) of the storage space (e.g., storage space 132) within the frontend system (e.g., server computer/controller 100) and may locate 204 a second portion (e.g., portion 138) of the storage space (e.g., storage space 132) within the backend system (e.g., data array 130).

First portion 136 of storage space 132 and/or second portion 138 of storage space 132 may be thinly provisioned. As is known in the art, thin provisioning is the act of provisioning storage space based upon actual need as opposed to stated capacity. Accordingly, in the event that a 100 GB storage volume is thinly provisioned for a user, the quantity of storage actually blocked out for that user will be equal to the actual quantity of data stored in the storage volume (as opposed to the stated capacity of the storage volume). Therefore, in the event that the storage volume has a stated capacity of 100 GB, prior to storing any data within that storage volume, the storage volume would have an actual capacity of 0 GB (with a defined maximum capacity of 100 GB). If the user copies 20 GB of data to the storage volume, the storage volume would have an actual capacity of 20 GB (with a defined maximum capacity of 100 GB). Accordingly, free space within the storage system is never blocked out to reserve unused storage capacity for a storage volume. Specifically, the actual size of the storage volume is elastic and, therefore, expands to a size large enough to store the data copied to the storage volume (i.e., up to its defined maximum capacity).

Accordingly, storage space 132 may be made up of a portion (e.g. portion 136) of storage device 134 included within server computer/controller 100 in combination with a portion (e.g. portion 138) of data array 130. As discussed above, storage space 132 may have a defined capacity, wherein the individual capacities of portion 136 and portion 138 may vary depending upon the specific type of data being stored within storage space 132 (as will be discussed below in greater detail).

Therefore, first portion 136 of storage space 132 may be within 100% and 0% of the defined capacity of storage space 132, while second portion 138 of storage space 132 may be within 0% and 100% of the defined capacity of storage space 132.

For example, assume for illustrative purposes that storage management process 10 defines 200 storage space 132 to have a defined capacity of 100 GB. Accordingly, storage management process 10 may configure storage space 132 so that e.g. first portion 136 of storage space 132 has a capacity of 100 GB and second portion 138 of storage space 132 has a capacity of 0 GB. Alternatively, storage management process 10 may configure storage space 132 so that e.g. first portion 136 of storage space 132 has a capacity of 0 GB and second portion 138 of storage space 132 has a capacity of 100 GB. Alternatively still, storage management process 10 may configure storage space 132 so that the defined capacity (e.g., 100 GB) of storage space 132 is apportioned between first and second portions 136, 138 of storage space 132. For example, first portion 136 of storage space 132 may have a capacity of 60 GB and second portion 138 of storage system 132 may have a capacity of 40 GB (or any other ratio).

As discussed above, the individual capacities of portion 136 and portion 138 may vary depending upon the specific type of data being stored within storage space 132. Accordingly, storage management process 10 may monitor 206 usage of a data item (e.g., data item 140) stored within storage space 132 to identify a usage pattern. An example of data item 140 may include content (e.g., content 118) that was written to storage space 132.

Specifically, certain portions of data stored within storage space 132 may be utilized frequently while other portions of data stored within storage space 132 may be utilized rarely. For example, data files associated with e.g., a corporate telephone directory may be utilized continuously during the course of business, while data files associated with end-of-year accounting operations may be utilized rarely (e.g. one month per year). As is known in the art, nonvolatile storage systems (and components thereof) may be configured to provide varying levels of performance. For example, flash-based storage systems may provide the highest level of performance, followed by fiber-channel-based storage systems that may provide a middle-level of performance, wherein SATA-based storage systems may provide the lowest level performance. Accordingly, in order maximize overall efficiency, it may be desirable to place data that is accessed the most frequently on the highest performing storage systems, wherein data that is accessed least frequently they be placed on the lowest performing storage systems.

Accordingly, storage management process 10 may monitor 206 the manner in which individual pieces of data (stored within storage space 132) are accessed to determine where they should be stored within storage space 132. As first portion 136 of storage space 132 is included within server computer/controller 100, the performance associated with first portion 136 of storage space 132 may generally exceed the performance associated with second portion 138 of storage space 132 when processing an I/O request (e.g. write request 116 and/or read request 120) on server computer/controller 100. Specifically, the performance associated with second portion 138 of storage system 132 may be lower than the performance associated with first portion 136 of storage system 132 due to having to access second portion 138 of storage system 132 via network infrastructure 114 (which may introduce networking delays).

Storage management process 10 may migrate 208 the data item (e.g., data item 140) to either first portion 136 of storage space 132 or second portion 138 of storage space 132 based, at least in part, upon the above-described usage pattern. Therefore, in the event that a usage pattern associated with e.g. data item 140 indicates a high level of usage, storage management process 10 may migrate 208 data item 140 to first portion 136 of storage system 132. Alternatively, in the event that a usage pattern associated with e.g. data item 140 indicates a low level of usage, storage management process 10 may migrate 208 data item 140 to second portion 138 of storage system 132. Accordingly and during the operation of storage system 132, storage management process 10 may migrate data between storage portions 136, 138.

Accordingly, when migrating 208 data (e.g., data item 140), storage management process 10 may relocate 210 data item 140 from first portion 136 of storage space 132 to second portion 138 of storage space 132 based, at least in part, upon the above-described usage pattern. Accordingly, if data item 140 was initially a frequently used data item that was placed within first portion 136 of storage system 132 by storage management process 10, in the event that data item 140 grows cold over time and, therefore, is used less frequently, storage management process 10 may relocate 210 data item 140 to second portion 138 of storage system 132.

Further, when migrating 208 data (e.g., data item 140), storage management process 10 may relocate 212 data item 140 from second portion 138 of storage space 132 to first portion 136 of storage space 132 based, at least in part, upon the above-described usage pattern. Accordingly, if data item 140 was initially infrequently used and was placed within second portion 138 of storage system 132 by storage management process 10, in the event that data item 140 grows hot over time and, therefore, becomes more frequently used, storage management process 10 may relocate 212 data item 140 to first portion 136 of storage system 132.

As discussed above, nonvolatile storage systems (and components thereof) may be configured to provide varying levels of performance. For example, flash-based storage systems may provide the highest level of performance, followed by fiber-channel-based storage systems that may provide a middle-level performance, wherein SATA-based storage systems may provide the lowest level performance. In the above discussion, storage system 132 was described as having two levels of performance, namely a higher performing portion (e.g. first portion 136) and a lower performing portion (e.g. second portion 138). However, this is for illustrative purposes only and is not intended to be a limitation of this disclosure, as of the configurations are possible. For example, second portion 138 of storage system 132 may be a multitier storage system that includes a plurality of storage tiers, each of which may have a different performance level.

For example, assume that storage target 102 is a solid-state storage device and, therefore, has the highest level of performance. Further assume that storage target 104 is a fiber channel storage device and, therefore, has a medium level of performance. Further still, assume that storage targets 106, 108 are SATA hard disk drives and, therefore, have the lowest level of performance. Assume for illustrative purposes that storage device 134 is also a solid-state storage device. However and as discussed above, due to the fact that storage device 134 may be accessed without needing to pass through network infrastructure 114, storage device 134 may provide a higher level of performance than any of the storage devices included within data array 130 (namely storage targets 102, 104, 106, 108). Accordingly, storage device 134 may provide the highest level of performance, followed by storage target 102 (providing an upper-mid-level of performance), followed by storage target 104 (providing a lower-mid-level of performance), followed by storage targets 106, 108 (providing the lowest level of performance).

Accordingly, in the event that storage management process 10 determines a usage pattern for data item 140 that results in the migration 208 of data item 140 from first portion 136 to second portion 138 of storage system 132, storage management process 10 (or a similar process resident on and executed within data array 130) may migrate data item 140 between the various performance tiers included within second portion 138 of storage system 132 (e.g., between storage targets 102, 104, 106, 108).

As discussed above, first portion 136 of storage space 132 and/or second portion 138 of storage space 132 may be thinly provisioned. Therefore, first portion 136 of storage space 132 may be within 100% and 0% of the defined capacity of storage space 132, while second portion 138 of storage space 132 may be within 0% and 100% of the defined capacity of storage space 132.

Accordingly, assume for illustrative purposes that storage space 132 is defined 200 by storage management system 10 to have a defined capacity of 100 GB. Further assume that no data has yet been copied to storage space 132. Assume further that storage management system 10 locates 202 first portion 136 of storage space 132 within server computer/controller 100 and locates 204 second portion 138 of storage space 132 within data array 130. At this point in time, the actual size of storage space 132 is 0 GB (even though the defined capacity is 100 GB).

Assume for illustrative purposes that 20 GB of data are initially copied to storage system 132, wherein this data is initially written to first portion 136 of storage system 132, as it is unknown whether this data will prove to be hot data or cold data. Assume that storage management system 10 monitors 206 the use of this 20 GB of data and determines that the first 10 GB (of the 20 GB of data) is highly used and that the second 10 GB (of the 20 GB of data) is less frequently used. Accordingly, storage management process 10 may relocate 210 the second 10 GB (of the 20 GB of data) from first portion 136 of storage system 132 to second portion 138 of storage system 132. At this point time, the actual size of storage space 132 is 20 GB (even though the defined capacity is 100 GB). While stored within second portion 138 of storage system 132, this second 10 GB (of the 20 GB of data) may be migrated between the various performance tiers included within second portion 138 of storage system 132 (e.g., between storage targets 102, 104, 106, 108).

Further assume that first 10 GB (of the 20 GB of data) is no longer needed by the user and, therefore, is deleted. At this point time, the actual size of storage space 132 is 10 GB (even though the defined capacity is 100 GB), with 10 GB of data stored within second portion 138 of storage system 132. Assume that storage management system 10 continues to monitor 206 the use of this 10 GB of data stored within second portion 138 of storage system 132 and determines that this data has grown hot again. Accordingly, storage management process 10 may relocate 212 this 10 GB from second portion 138 of storage system 132 to first portion 136 of storage system 132. At this point time, the actual size of storage space 132 is 10 GB (even though the defined capacity is 100 GB).

Accordingly, the only time that the defined capacity comes into play is when the total quantity of data to be written to storage space 132 would exceed the defined capacity.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    defining a storage space having a user-defined capacity within a storage system, wherein the storage system includes a frontend system and a backend system and the user-defined capacity of the storage space is at least a portion of the total capacity of the storage system;
    locating a first portion of the storage space locally connected within the frontend system within a server computer;
    locating a second portion of the storage space remotely connected via a network within the backend system within a backend data array, wherein the first portion of the storage space locally connected within the frontend system and the second portion of the storage space remotely within the backend system are included in the storage space having the user-defined capacity;
    monitoring usage of a data item stored within the storage space to identify a usage pattern;
    apportioning a first capacity of the user-defined capacity of the storage space to the first portion and apportioning a second capacity of the user-defined capacity of the storage space to the second portion based, at least in part, upon the usage pattern of the data item, wherein the combined capacity of the first capacity and the second capacity is the user-defined capacity; and
    migrating the data item between the first portion of the storage space locally connected within the frontend system and the second portion of the storage space remotely connected via the network within the backend system based, at least in part, upon the usage pattern of the data item;
    wherein the server computer and the backend data array are separated by the network.

2. The computer-implemented method of claim 1 wherein migrating the data item includes:
    relocating the data item from the first portion of the storage space to the second portion of the storage space based, at least in part, upon the usage pattern, wherein the second portion of the storage space is a multitier storage system including a plurality of storage tiers, wherein each of the plurality of storage tiers include a different performance level.

3. The computer-implemented method of claim 1 wherein migrating the data item includes:
    relocating the data item from the second portion of the storage space to the first portion of the storage space based, at least in part, upon the usage pattern.

4. The computer-implemented method of claim 1 wherein the first portion of the storage space is a thinly provisioned first portion of the storage space.

5. The computer-implemented method of claim 1 wherein the second portion of the storage space is a thinly provisioned second portion of the storage space.

6. The computer-implemented method of claim 1 wherein:
    the first capacity apportioned to the first portion of the storage space is within 100% and 0% of the user-defined capacity; and
    the second capacity apportioned to the second portion of the storage space is within 0% and 100% of the user-defined capacity.

7. The computer-implemented method of claim 1 wherein the storage space includes a direct attached storage device.

8. A computer program product residing on a non-transitory computer readable medium having a plurality of instructions stored thereon which, when executed by a processor, cause the processor to perform operations comprising:
    defining a storage space having a user-defined capacity within a storage system, wherein the storage system includes a frontend system and a backend system and the user-defined capacity of the storage space is at least a portion of the total capacity of the storage system;
    locating a first portion of the storage space locally connected within the frontend system within a server computer;
    locating a second portion of the storage space remotely connected via a network within the backend system within a backend data array, wherein the first portion of the storage space locally connected within the frontend system and the second portion of the storage space remotely within the backend system are included in the storage space having the user-defined capacity;
    monitoring usage of a data item stored within the storage space to identify a usage pattern;
    apportioning a first capacity of the user-defined capacity of the storage space to the first portion and apportioning a second capacity of the user-defined capacity of the storage space to the second portion based, at least in part, upon the usage pattern of the data item, wherein the combined capacity of the first capacity and the second capacity is the user-defined capacity; and
    migrating the data item between the first portion of the storage space locally connected within the frontend system and the second portion of the storage space remotely connected via the network within the backend system based, at least in part, upon the usage pattern of the data item;
    wherein the server computer and the backend data array are separated by the network.

9. The computer program product of claim 8 wherein the instructions for migrating the data item include instructions for:
    relocating the data item from the first portion of the storage space to the second portion of the storage space based, at least in part, upon the usage pattern, wherein the second portion of the storage space is a multitier storage system including a plurality of storage tiers, wherein each of the plurality of storage tiers include a different performance level.

10. The computer program product of claim 8 wherein the instructions for migrating the data item include instructions for:
    relocating the data item from the second portion of the storage space to the first portion of the storage space based, at least in part, upon the usage pattern.

11. The computer program product of claim 8 wherein the first portion of the storage space is a thinly provisioned first portion of the storage space.

12. The computer program product of claim 8 wherein the second portion of the storage space is a thinly provisioned second portion of the storage space.

13. The computer program product of claim 8 wherein:
the first capacity apportioned to the first portion of the storage space is within 100% and 0% of the user-defined capacity; and
the second capacity apportioned to the second portion of the storage space is within 0% and 100% of the user-defined capacity.

14. The computer program product of claim 8 wherein the storage space includes a direct attached storage device.

15. A computing system including at least one processor and at least one memory architecture coupled with the at least one processor, wherein the computing system is configured to perform operations comprising:
defining a storage space having a user-defined capacity within a storage system, wherein the storage system includes a frontend system and a backend system and the user-defined capacity of the storage space is at least a portion of the total capacity of the storage system;
locating a first portion of the storage space locally connected within the frontend system within a server computer;
locating a second portion of the storage space remotely connected via a network within the backend system within a backend data array, wherein the first portion of the storage space locally connected within the frontend system and the second portion of the storage space remotely within the backend system are included in the storage space having the user-defined capacity;
monitoring usage of a data item stored within the storage space to identify a usage pattern;
apportioning a first capacity of the user-defined capacity of the storage space to the first portion and apportioning a second capacity of the user-defined capacity of the storage space to the second portion based, at least in part, upon the usage pattern of the data item, wherein the combined capacity of the first capacity and the second capacity is the user-defined capacity; and
migrating the data item between the first portion of the storage space locally connected within the frontend system and the second portion of the storage space remotely connected via the network within the backend system based, at least in part, upon the usage pattern of the data item;
wherein the server computer and the backend data array are separated by the network.

16. The computing system of claim 15 wherein migrating the data item includes:
relocating the data item from the first portion of the storage space to the second portion of the storage space based, at least in part, upon the usage pattern, wherein the second portion of the storage space is a multitier storage system including a plurality of storage tiers, wherein each of the plurality of storage tiers include a different performance level.

17. The computing system of claim 15 wherein migrating the data item includes:
relocating the data item from the second portion of the storage space to the first portion of the storage space based, at least in part, upon the usage pattern.

18. The computing system of claim 15 wherein the first portion of the storage space is a thinly provisioned first portion of the storage space.

19. The computing system of claim 15 wherein the second portion of the storage space is a thinly provisioned second portion of the storage space.

20. The computing system of claim 15 wherein:
the first capacity apportioned to the first portion of the storage space is within 100% and 0% of the user-defined capacity; and
the second capacity apportioned to the second portion of the storage space is within 0% and 100% of the user-defined capacity.

21. The computing system of claim 15 wherein the storage space includes a direct attached storage device.

22. A computer-implemented method comprising:
defining a storage space having a user-defined capacity, wherein the storage space is shared between a first portion of a frontend system locally connected to a server computer and a second portion of a backend system of a backend data array remotely connected to the server computer, wherein the server computer and the backend data array are separated by a network, wherein the first portion of the storage space and the second portion of the storage space are included in the storage space having the user-defined capacity system and the user-defined capacity of the storage space is at least a portion of the total capacity of the storage system;
monitoring usage of a data item stored within the storage space to identify a usage pattern;
apportioning a first capacity of the user-defined capacity of the storage space to the first portion and apportioning a second capacity of the user-defined capacity of the storage space to the second portion based, at least in part, upon the usage pattern of the data item, wherein the combined capacity of the first capacity and the second capacity is the user-defined capacity; and
migrating the data item between the first portion of the storage space locally connected to the server computer and the second portion of the storage space remotely connected via the network to the server computer based, at least in part, upon the usage pattern of the data item.

* * * * *